(12) United States Patent
Duis et al.

(10) Patent No.: US 8,697,770 B2
(45) Date of Patent: Apr. 15, 2014

(54) PUPIL-ONLY PHOTOCHROMIC CONTACT LENSES DISPLAYING DESIRABLE OPTICS AND COMFORT

(75) Inventors: Donnie J. Duis, Jacksonville, FL (US); Yongcheng Li, St. Augustine, FL (US); Leilani K. Sonoda, Atlantic Beach, FL (US); Holly L. Grammer, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 96 days.

(21) Appl. No.: 13/082,447

(22) Filed: Apr. 8, 2011

(65) Prior Publication Data
US 2011/0249235 A1    Oct. 13, 2011

Related U.S. Application Data

(60) Provisional application No. 61/323,410, filed on Apr. 13, 2010.

(51) Int. Cl.
*G02C 7/04* (2006.01)
*G02B 1/04* (2006.01)

(52) U.S. Cl.
USPC . 523/107; 523/106; 351/159.02; 351/159.61; 351/159.73; 351/159.74; 351/159.77

(58) Field of Classification Search
USPC ............ 523/106, 107; 351/159.02, 159.61, 351/159.73, 159.74, 159.77
See application file for complete search history.

(56) References Cited

U.S. PATENT DOCUMENTS

| | | | |
|---|---|---|---|
| 4,681,412 A | 7/1987 | Lemelson | |
| 5,760,100 A | 6/1998 | Nicolson | |
| 5,776,999 A | 7/1998 | Nicolson | |
| 5,789,461 A | 8/1998 | Nicolson | |
| 5,849,811 A | 12/1998 | Nicolson | |
| 5,965,631 A | 10/1999 | Nicolson | |
| 5,998,498 A | 12/1999 | Vanderlaan | |
| 6,087,415 A | 7/2000 | Vanderlaan | |
| 6,113,814 A * | 9/2000 | Gemert et al. | 252/586 |
| 5,760,100 B1 | 11/2000 | Nicolson | |
| 5,776,999 B1 | 11/2000 | Nicolson | |
| 5,789,461 B1 | 11/2000 | Nicolson | |

(Continued)

FOREIGN PATENT DOCUMENTS

| | | |
|---|---|---|
| GB | 2305256 A | 4/1997 |
| WO | WO 2008003012 A2 | 1/2008 |

(Continued)

OTHER PUBLICATIONS

PCT International Search Report, dated Aug. 3, 2011, for PCT Int'l Appln. No. PCT/US2011/031880.

*Primary Examiner* — Michael Pepitone
(74) *Attorney, Agent, or Firm* — Karen A. Harding

(57) ABSTRACT

A method for making a hydrogel, photochromic contact lens including supplying a first lens composition comprising a contact lens monomer and a photochromic material to a front contact lens mold and supplying a second lens composition to said contact lens mold wherein the viscosity of said first composition is at least about 1000 cp greater than the viscosity of said second contact lens composition, and the makeup of said second composition matches the of said first composition to reduce strain between said compositions of the resulting lens.

16 Claims, 7 Drawing Sheets

(56) References Cited

U.S. PATENT DOCUMENTS

| | | |
|---|---|---|
| 5,849,811 B1 | 11/2000 | Nicolson |
| 7,553,880 B2 | 6/2009 | Nicolson |
| 2003/0142267 A1 | 7/2003 | Gemert |
| 2005/0218536 A1 | 10/2005 | Quinn |
| 2005/0258408 A1* | 11/2005 | Molock et al. ................ 252/586 |
| 2006/0055882 A1 | 3/2006 | Phelan |
| 2008/0125512 A1* | 5/2008 | Van Gemert et al. ......... 523/106 |
| 2009/0244479 A1 | 10/2009 | Zanini |
| 2010/0048847 A1 | 2/2010 | Broad |

FOREIGN PATENT DOCUMENTS

| | | |
|---|---|---|
| WO | WO 2008003012 A3 | 1/2008 |
| WO | WO 2008061992 A2 | 5/2008 |
| WO | WO 2008061992 A3 | 5/2008 |

* cited by examiner

US 8,697,770 B2

PUPIL-ONLY PHOTOCHROMIC CONTACT LENSES DISPLAYING DESIRABLE OPTICS AND COMFORT

RELATED APPLICATIONS

This application claims priority to provisional U.S. Patent Application Ser. No. 61/323,410, filed Apr. 13, 2010.

TECHNICAL FIELD

The present invention relates to contact lens eyewear and, more particularly, to contact lenses with photochromic dyes disposed in the region of the lens covering the pupil region when worn, the photochromic contact lenses having improved cosmetic appearance and improved structural qualities. The invention also relates to methods and materials used for making such photochromic contact lenses.

BACKGROUND INFORMATION

Early contact lenses have been known with photochromic liquid held in a reservoir disposed between two materials forming a contact lens as part of a protective system against intense flashes such as a nuclear detonation.

More recently, efforts have been directed towards photochromic contact lenses that can be worn daily and that quickly transition between colored and uncolored states utilizing photochromic dyes capable of absorbing light in specific wavelength ranges. In some examples, a dye is dispensed in a lens capable of exhibiting photochromism in the polymeric material comprising the contact lens so as to preferably have a single layer capable of absorbing light. However the contact lenses that exhibit photochromism throughout the entire lens area, "edge-to-edge", are not desired due to cosmetic reasons.

Therefore, efforts have been made to create a contact lens that changes color only in the central pupil region, "pupil-only" contact lens.

US2003/0142267 discloses contact lenses having a photochromic material in the center or pupil region of the lens only. The lens is made by dispensing monomer mixes having different viscosities into the lens mold. The contact lenses are hard contact lenses which have no water content. The process disclosed in US2003/0142267 does not produce soft, hydrogel contact lenses which have desirable properties such as good optics and comfort.

There is a need for an improved pupil only photochromic contact lens, including a method of manufacturing such lenses, that exhibits reduced deformation and optical distortion and increased comfort, wear ability, and cosmetic appearance.

BRIEF DESCRIPTION OF THE DRAWINGS

The present invention is disclosed with reference to the accompanying drawings, wherein.

DETAILED DESCRIPTION

As used herein hydrogels are water swellable polymers which have water contents between about 20 and about 75% water.

As used herein reactive mixture or monomer mixture means

As used herein, expansion factor or swell is the change in dimension of a hydrogel article after hydration. Expansion factor may be calculated by dividing the diameter of hydrated lens by the lens formed in the mold prior to extraction and hydration and multiplying by 100.

As used herein sagittal depth is the height of a contact lens, measured at its center (vertex) and from a chord drawn across the lens at its base diameter. Known tests may be used to measure sagittal depth, including ISO 18369-3, using an ultrasound instrument (section 4.1.4.2.3).

Generally, one way to manufacture soft, hydrogel contact lenses is to cast mold contact lenses in plastic molds. Typically there are two mold portions which, when assembled, form a cavity. A reactive mixture which cures within the cavity forms a contact lens. Typically a first mold portion is dosed with the reactive mixture, and the second mold portion is placed on the first mold portion, and then the reactive mixture is cured. The reaction of the reactive mixture is commonly radiation activated. The reactive mixture in the cavity cures e.g. polymerizes and/or crosslinks to form the contact lens. The cured hydrogel contact lens is then removed from the molds and put in a solvent to remove the undesired chemical components. The lens normally swells in the process. The lens is then brought into contact with water to exchange the solvent with water, and give the hydrogel its final, stable shape and size.

Figure 1A:
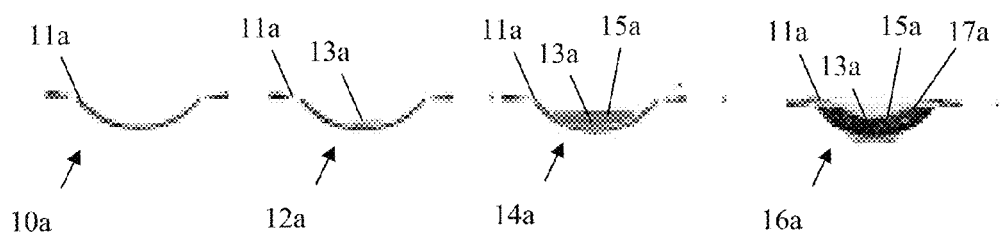
FIGS. 1A and 1B schematically represent methods of making pupil only photochromic lenses according to the invention.

Specifically referring to FIG. 1, two methods of manufacturing pupil only photochromic contact lenses are schematically shown. In the first method shown in FIG. 1a, a front curve 11a is provided at step 10a. The front curve 11a is one part of the two part mold that is concave in shape so that the deposited material is held in the center of the mold by gravity. At step 12a, a small and precise dose of photochromic dye-containing monomer mixture 13a, or pupil monomer mixture, is supplied or dosed on a surface of the front curve mold 11a preferably in a substantially central location and in substantially circular configuration.

In one embodiment, the photochromic dye-containing monomer mixture is dosed in a central circular area within the optic zone of the contact lens. The central circular area may be the same size as the optic zone, which in a typical contact lens is about 9 mm or less in diameter. In one embodiment, the central circular area has a diameter of between about 4 and about 7 mm and in another between about 4 and about 6 mm in diameter.

Optionally, the photochromic dye-containing monomer mixture may be at least partially polymerized through a controlled curing mechanism at step 12a. Then, a dose of clear monomer mixture, which does not contain a photochromic dye, 15a is dosed on the top of the photochromic dye-containing monomer mixture 13a at step 14a. The dose of clear monomer mixture 15a fills the concave front curve 11a to the desired amount and then, at step 16a, the base curve 17a is provided and the mold halves 11a, 17a are put into their final curing position and the monomer mixtures are cured and/or polymerized completing the molding process. Where the polymerization process includes a photo-polymerization mechanism, the radiation, may be directed to either the front curve mold half or the base curve mold half, or both. The molded lens is then extracted to remove the un-desired chemical components and hydrated.

Figure 1B:
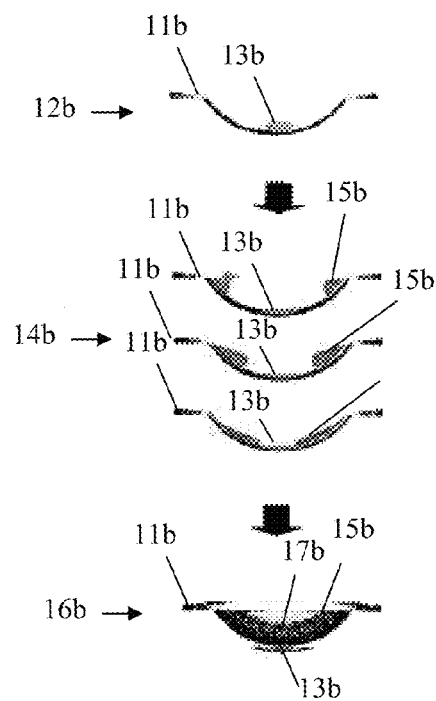

An alternative method is shown in FIG. 1b in which the first dose of photochromic monomer mixture 13b is provided in the center of a front curve mold 11b at step 12b and then an annular ring of clear monomer mixture 15b is dosed at the edge of the front curve mold 11b at step 14b. The resultant annular ring of clear monomeric material 15b is drawn to the center of the front curve by gravity. The base curve mold 17b is then supplied and the curing is initiated and completed at step 16b and the extraction and hydration step(s) (not shown) proceed to form the final hydrogel contact lens product.

In order to provide a hydrogel contact lens with acceptable separation of the two regions (print quality) and low distortion, generally in terms of centralized photochromic dye 11 distribution, it has been found that, as described by US2003/0142267, increasing the viscosities of the monomer mixtures 13, 15 and, specifically, increasing the viscosity of the photochromic dye monomer mixture 13 as compared to the clear monomer mixture 15, reduces molecular diffusion of the monomers 13, 15 thereby maintaining photochromic dye in the central region. Using a photochromic dye monomer mixture that has higher viscosity than the clear monomer mixture helps to reduce the shear at the interface of the two monomers mixtures thereby reducing the physical mixing. An analysis of the Stokes-Einstein equation, shown below, illustrates the parameters that affect the diffusivity of a material:

$$D = \frac{kT}{6\pi\mu r}$$

where, D is the molecular diffusivity, k the Boltzmann constant, T the temperature, $\mu$ the viscosity and r the radius of the molecule. Operating at lower temperatures and using monomers of higher viscosities tends to reduce the molecular diffusion rate. In one embodiment the viscosity of the photochromic dye monomer mixture is at least about 1000 cp higher than the viscosity of the clear or peripheral monomer mixture and in another embodiment at least about 1500 cp higher.

However, controlling the viscosity of the monomer mixtures as disclosed in US2003/0142267 was insufficient to provide hydrogel contact lenses having suitable optics and comfort. Hydrogel monomer mixtures when cured together produced contact lenses which displayed flattened optic zones, instead of lenses with a continuous radius. This may be measured by measuring the sagittal depth of the contact lens. Hydrogel lenses of the present invention have sagittal depths which are within about 100 microns of the design sagittal depth for the lens. In one embodiment the deviation from the design sagittal depth ranges from 0 (matched to the design sagittal depth) to −100 microns, which represents a slight flattening from the design sagittal depth.

It has been found that by balancing the expansion factor of the polymers formed from the photochromic dye monomer mixture and the clear monomer mixture hydrogel contact lenses having desirable optics and comfort may be produced. In one embodiment the expansion factors of the polymers formed from the respective monomer mixtures are within about 10% in some embodiments within about 8% and in other embodiments within about 5%. The expansion factor may be adjusted by manipulating a number of formulation variables including the diluent concentration, the concentration and hydrophilicity or hydrophobicity of hydrophilic and hydrophobic components and concentration of initiator and crosslinker, and combinations thereof. Many photochromic dyes are highly hydrophobic and at the concentrations used in the present invention can have an impact on the expansion factor the hydrogels which contain them. In one embodiment, where the photochromic dye is hydrophobic, it is added to the formulation replacing a similar amount of another hydrophobic component. Similarly, if the photochromic compound were hydrophilic it will be added to the formulation replacing a similar amount of another hydrophilic component. In some embodiments, for example, where a silicone hydrogel contact lens is being produced, it may be desirable to maintain the concentration of the silicone components and replace a part of one of hydrophilic components. In these embodiments, multiple adjustments may be needed to achieve the desired expansion factor.

In addition, other formulation variables may be modified to achieve the desired expansion factor. In some embodiments varying the concentration of the hydrophilic components, the diluent concentration and the initiator concentration, and combinations thereof have been effective at providing photochromic contact lenses having desirable optics and comfort. In one embodiment a hydrophilic polymer, such as poly(vinyl pyrrolidone) (PVP), methacrylic acid, polydimethylacrylamide or poly(vinyl methacetamide) may be added to the photochromic dye monomer mixture.

In some embodiments it is desirable to use the same or similar components in both the photochromic dye and clear monomer mixtures. For example, it may be desirable to include the same hydrophilic components in both monomer mixtures. In this case, formulation variables in addition to the concentration of hydrophilic components may be varied. The examples further illustrate how the formulation variables may be balanced.

In one embodiment, where a single sided cure is used the expansion factor is matched using monomers, diluent concentration and combinations thereof. Where cure is effected from only one side (such as during photocuring), increasing the initiator concentration may also be desirable.

The clear monomer mixtures 15 that may be employed in the invention include soft contact lens materials made from HEMA based hydrogel or silicone hydrogel materials, which include but are not limited to silicone hydrogels, and fluorohydrogels. Examples of soft contact lenses formulations include but are not limited to the formulations of etafilcon A, genfilcon A, lenefilcon A, polymacon, acquafilcon A, balafilcon A, galyfilcon A, senofilcon, narafilcon A, narafilcon B, comfilcon, filcon II 3, asmofilcon, Monomer A and lotrafilcon A, and the like. Silicone hydrogels formulations, such as those disclosed in U.S. Pat. No. 5,998,498; U.S. patent application Ser. No. 09/532,943, a continuation-in-part of U.S. patent application Ser. No. 09/532,943, filed on Aug. 30, 2000, and U.S. Pat. Nos. 6,087,415, 6,087,415, 5,760,100, 5,776,999, 5,789,461, 5,849,811, 5,965,631, 7,553,880, WO2008/061992, US2010/048847, may also be used. These patents are hereby incorporated by reference for the hydrogel compositions contained therein. In one embodiment contact lens formulations are selected from etafilcon A, balafilcon A, acquafilcon A, lotrafilcon A, galyfilcon A, senfilcon, comfilcon, narafilcon, Monomer A and silicone hydrogels.

Additionally, suitable contact lenses may be formed from reaction mixtures comprising at least one silicone containing component. A silicone-containing component is one that contains at least one [—Si—O—Si] group, in a monomer, macromer or prepolymer. Preferably, the Si and attached 0 are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone components which may be included in the silicone hydrogel formulations include, but are not limited to silicone macromers, prepolymers and monomers. Examples of silicone macromers include, without limitation, polydimethylsiloxane methacrylated with pendant hydrophilic groups.

Silicone and/or fluorine containing macromers may also be used. Suitable silicone monomers include tris(trimethylsiloxy)silylpropyl methacrylate, hydroxyl functional silicone containing monomers, such as 3-methacryloxy-2-hydroxypropyloxy)propylbis(trimethylsiloxy)methylsilane.

Additional suitable siloxane containing monomers include, amide analogs of TRIS. Vinylcarbanate or carbonate analogs, monomethacryloxypropyl terminated polydimethylsiloxanes, polydimethylsiloxanes, 3-methacryloxypropyl-bis(trimethylsiloxy)methylsilane, methacryloxypropylpentamethyl disiloxane and combinations thereof.

Exemplary photochromic materials that may be employed in some embodiments may include dyes mixed with contact lens materials, or alternately, polymerizeable monomers that are themselves photochromic. Other exemplary materials may include one or more of the following: polymerizable photochromic materials, such as polymerizable naphthoxazines; polymerizable spirobenzopyrans; polymerizable spirobenzopyrans and spirobenzothiopyrans; polymerizable fulgides; polymerizable naphthacenediones; polymerizable spirooxazines; polymerizable polyalkoxylated naphthopyrans; and polymerizable photochromic compounds.

Furthermore the photochromic materials may include in some embodiments, one or more of the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds.

Other photochromic materials that may be useful in the invention include organo-metal dithiozonates, i.e., (arylazo)-thioformic arylhydrazidates, e.g., mercury dithizonates; and fulgides and fulgimides, e.g., the 3-furyl and 3-thienyl fulgides and fulgimides. Non-limiting examples of suitable photochromic dyes include

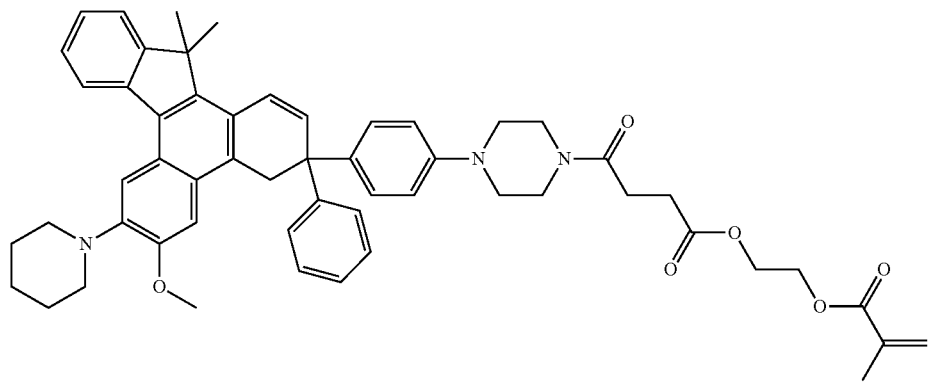

Formula I

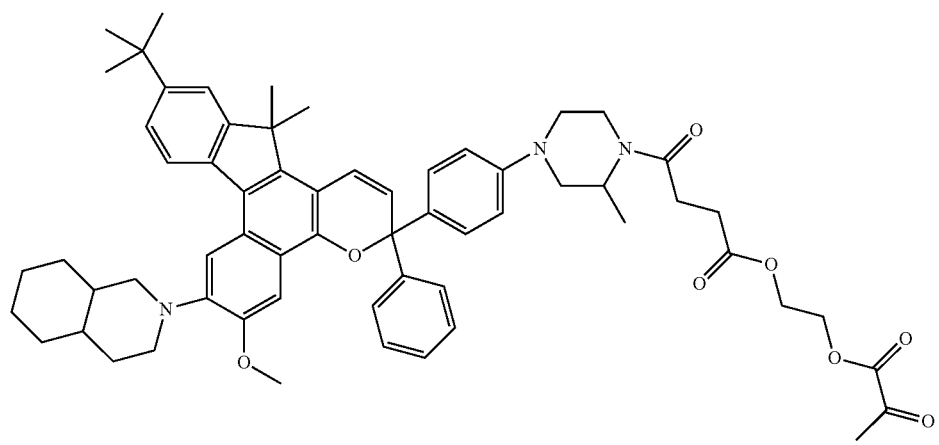

Formula II

-continued

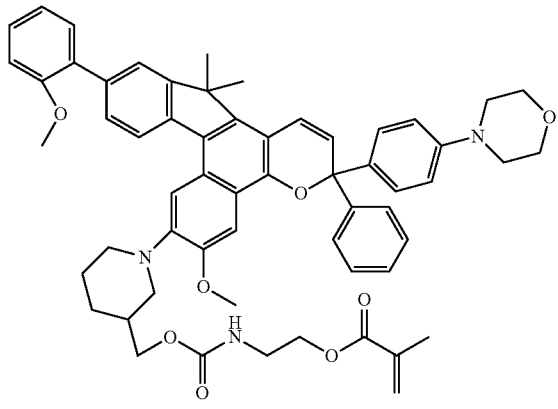

Formula III

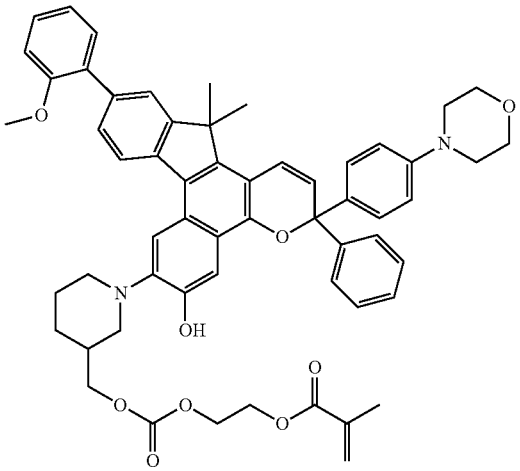

Formula IV

The following examples and experiments illustrate certain aspects of the present invention, but they do not delineate or limit the invention.

EXAMPLES

The following abbreviations are used in the examples below:

| Abbreviation | Full Chemical Name |
|---|---|
| SiGMA | 2-propenoic acid, 2-methyl-,2-hydroxy-3-[3-[1,3,3,3-tetramethyl-1-[(trimethylsilyl)oxy]disiloxanyl]propoxy]propyl ester |
| HEMA | 2-hydroxyethyl methacrylate |
| mPDMS | 800-1000 MW ($M_n$) monomethacryloxypropyl terminated mono-n-butyl terminated polydimethylsiloxane |
| DMA | N,N-dimethylacrylamide |
| PVP | poly(N-vinyl pyrrolidone) (K value 90) |
| Norbloc | 2-(2'-hydroxy-5-methacrylyloxyethylphenyl)-2H-benzotriazole |
| CGI 819 | 1:1 (wgt) blend of 1-hydroxycyclohexyl phenyl ketone and bis(2,6-dimethoxybenzoyl)-2,4-4-trimethylpentyl phosphine oxide |
| Blue HEMA | the reaction product of Reactive Blue 4 and HEMA |
| IPA | isopropyl alcohol |
| D30 | 3,7-dimethyl-3-octanol |
| mPDMS-OH | mono-(3-methacryloxy-2-hydroxypropyloxy)propyl terminated, mono-butyl terminated polydimethylsiloxane (MW 1100) |
| TEGDMA | tetraethyleneglycol dimethacrylate |
| TPME | tripropylene glycol methyl ether |

Monomer Mixture A

Monomer mixture A was formed from the components listed in Table 1 and diluent (D30) (77 wt % components:23 wt % D30).

TABLE 1

| Components | Wt % |
|---|---|
| SiGMA | 28 |
| PVP (K90) | 7 |
| DMA | 24 |
| mPDMS | 31 |
| HEMA | 6 |
| Norbloc | 2 |
| CGI 1850 | 0.48 |
| TEGDMA | 1.5 |
| Blue HEMA | 0.02 |

Monomer Mixture B

Monomer mixture B was formed from the 55 wt % components listed in Table 1 and 45 wt % diluent (a mixture of 55 wt % TPME and 45 wt % decanoic acid co-diluent).

TABLE 2

| Monomer Components | |
|---|---|
| Monomers | wt. % |
| HO-mPDMS | 55 |
| TEGDMA | 3 |
| DMA | 19.53 |
| HEMA | 8.00 |
| PVP K-90 | 12 |
| CGI 819 | 0.25 |
| Norbloc | 2.2 |
| Blue HEMA | 0.02 |

The Monomer mixture B formulations were degassed at about 600-700 mmHg for approximately 30 minutes at ambient temperature prior to dosing.

Example 1

To demonstrate the feasibility for obtaining a pupil-only contact lens according to the method of FIG. 1a, 20 mg ball-pen ink was mixed into 1 g Monomer B monomer mixture listed in Table 2 to simulate the dye-containing pupil monomer and 3 mg of this monomer mixture was dosed into the center of a front curve mold 10c. The viscosity of the monomer mixture was ~3000 CP. Next, 80 mg of Monomer A monomer mixture was dosed on top of the pupil monomer mixture as shown in 14c. The viscosity of the Monomer A monomer mixture was ~300 CP. A base curve was then deposited and the molds were closed and irradiated at 1.2 to 1.8 mW/cm², under Philips TL K 40 W/03 light bulbs in a nitrogen atmosphere for 25 minutes at about 55±5° C.

Figure 2:
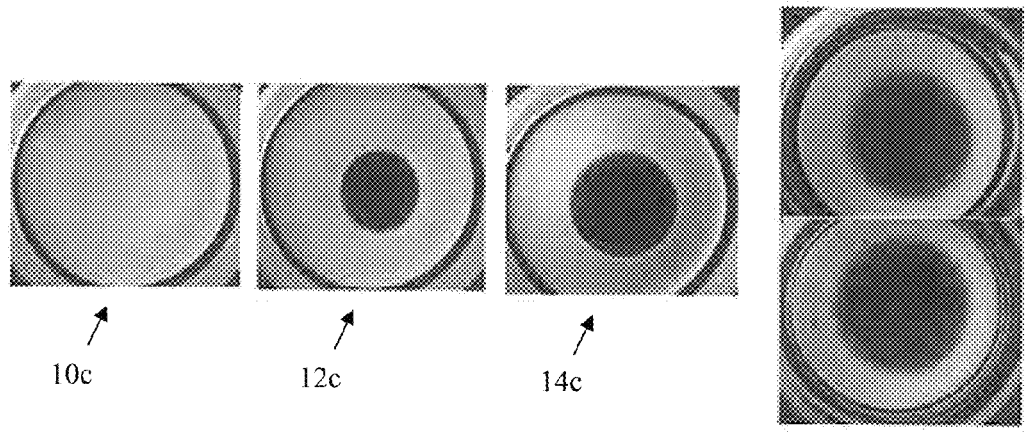
FIG. 2 is an exemplary lens made according to the methods of the invention.

The assembly was then cured resulting in the photo as shown in 16c. As can be seen in FIG. 2, a very clear boundary of the two monomer mixtures was observed.

Example 2

In this experiment, a photochromic dye of Formula I, made by PPG Industries, was used.

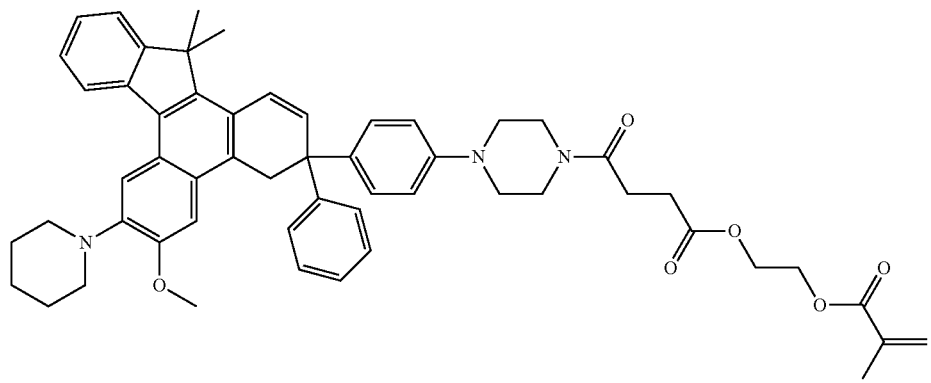

Formula I

5% photochromic dye was dissolved into a monomer mixture containing the components listed in Table 2, and 45% TPME as diluent. For the clear monomer mixture, Monomer B monomer mixture that contained 55% TPME as diluent was used. The viscosity of this material was ~400 CP. The monomer mixtures were then cured under 2% oxygen environment for 20 minutes, at 60° C. under 0.5 mW/cm2 intensity of Philips TL K 40 W/03 light bulbs. The base curve mold was then removed and the lens stayed in the front curve mold. The lens and front curve mold assembly was dropped into 90 C deionized water for 15 minutes to separate the lens from the mold, and extract and hydrate the lens. The lens was then packaged in packaging solution in glass vials and sterilized at 121° C.

The packing solution contains the following ingredients in deionized $H_2O$: 0.18 weight % sodium borate [1330-43-4], Mallinckrodt; 0.91 weight % boric acid [10043-35-3], Mallinckrodt; 1.4 weight % sodium chloride, Sigma; 0.005 weight % methylether cellulose [232-674-9] from Fisher Scientific.

Figure 3:
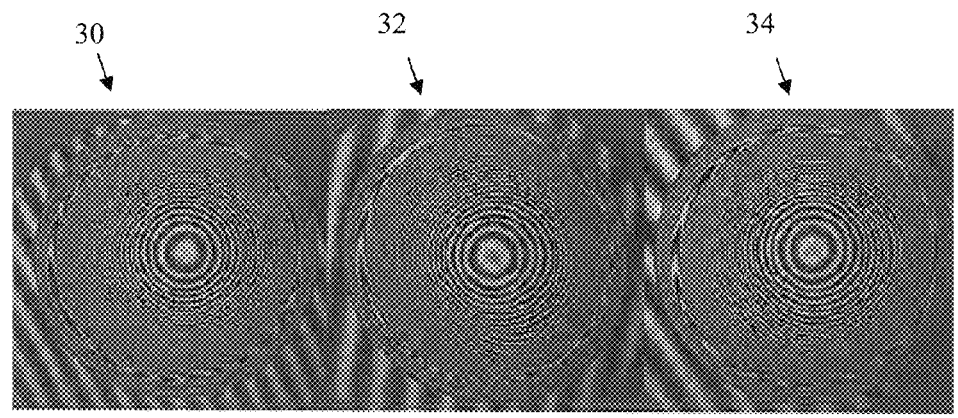
FIG. 3 shows an interferogram of a contact lens according to the invention.

FIG. 3 shows the interferrograms of three exemplary lenses 30, 32, and 34 produced in this Example 2. The interferrograms display smooth and continuous interference lines across the junctions between the lens portions formed from the two monomer mixtures. Accordingly, no obvious physical distortions were observed in any of the produced lenses.

Example 3

In this Example, the clear monomer outer region was Monomer mixture A, Table 1 and the pupil monomer mixture containing photochromic dye was based on Monomer mixture A with 5% additional PVP (poly(N-vinyl pyrolidone)) K90 added along with 6% photochromic dye. The additional PVP K90 shifted the viscosity of Monomer mixture A from ~300 CP to ~1200 CP which was sufficient to maintain a centralized optic zone containing photochromic dye.

3 mg of the pupil monomer mixture was dosed into the center of a Zeonor front curve lens mold. Next, 80 mg of monomer mixture A was closed on top of the pupil monomer mixture. A polypropylene base curve was then deposited on the front curve mold and the molds were closed. The filled molds were irradiated using Philips TL 20 W/03 T fluorescent bulbs above and below the lens molds and the following conditions: about 1 minute at about 1 $mW/sec^2$ at ambient temperature, about 7 minutes at 2 $mW/sec^2$ and 80° C. and about 4 minutes at 5.5. $mW/sec^2$ and 80° C. All curing was done in $N_2$. The molds were opened and lenses were extracted into a 70:30 (wt) solution of IPA and DI $H_2O$ at ambient temperature for at least 60 minutes. The IPA:DI water solution was exchanged twice, and soaked in IPA:DI water at ambient temperature for at least about 30 minutes for each additional exchange to remove residual diluent and monomers, placed into deionized $H_2O$ for about 30 minutes, then equilibrated in borate buffered saline for at least about 24 hours and autoclaved at 122° C. for 30 minutes.

Figure 4:
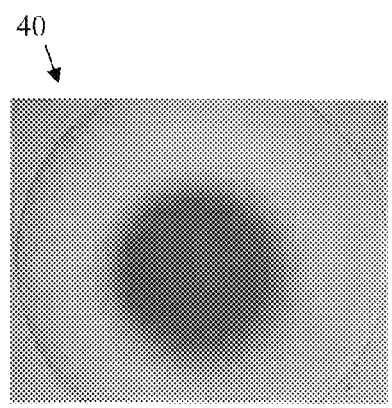
FIG. 4 is an exemplary lens according to the invention.

A lens 40 according to this experiment is shown at FIG. 4. One outcome of this experiment was that the addition of additional PVP K90 helped to shift the water content of the polymer in the pupil zone higher, thereby counterbalancing the reduction in water content caused by the addition of the hydrophobic photochromic dye. Accordingly, the degree of hydration of the polymers formed from both the dye-containing monomer mixture and the clear monomer mixture were in substantially conformity. Optical measurements indicate that the lenses created using this method have improved optic qualities.

Example 4

In this experiment, the clear monomer region was formed from Monomer B monomer mixture and the pupil region was formed from Monomer B material with photochromic dye. However in this experiment the viscosity was adjusted by changing the concentration of the diluent component Monomer B monomer mixture to 45%. The 45% diluent in the clear region is made up of 40% tert-amyl alcohol and 60% decanoic acid while the 45% diluent in the pupil monomer mixture was 100% decanoic acid. By modifying the diluents in this experiment the centering of the photochromic pupil region was well contained within the central region of the optic zone. Additional this change allowed the viscosities to differ by ~1800 cP between the inner (pupil) and outer (clear) regions while also providing a match in the swell of a hydrated lens in the two regions such that goods optics were obtained.

Example 5

A reaction mixture was formed from the components listed in Table 3 and diluent (D30) (77 wt % components:23 wt % D30) (Reactive Mixture C).

Photochromic dye of Formula I (6 wt % based upon the weight of the reaction components of Reactive Mixture C) and an additional 5% PVP was dissolved into Reactive Mixture C to form a Dye Containing Reactive Mixture.

3 mg of the Dye Containing Reactive Mixture was dosed into the center of a Zeonor front curve lens mold. Next, 80 mg of Reactive Mixture C was dosed on top of the Dye Containing Reactive Mixture. A polypropylene base curve was then deposited and the molds were closed. The filled molds were irradiated using Philips TL 20 W/03 T fluorescent bulbs above and below the lens molds and the following conditions: about 1 minute at about 1 $mW/sec^2$ at ambient temperature, about 7 minutes at 2 $mW/sec^2$ and 80° C. and about 4 minutes at 5.5. mW/sec² and 80° C. All curing was done in N₂. The molds were opened and lenses were extracted into a 70:30 (wt) solution of IPA and DI H₂O at ambient temperature for at least 60 minutes. The IPA:DI Water solution was exchanged twice, and soaked in IPA:DI water at ambient temperature for at least about 30 minutes for each additional exchange to remove residual diluent and monomers, placed into deionized H₂O for about 30 minutes, then equilibrated in borate buffered saline for at least about 24 hours and autoclaved at 122° C. for 30 minutes.

TABLE 3

| Component | |
|---|---|
| SiGMA | 28 |
| PVP (K90) | 7 |
| DMA | 24 |
| mPDMS | 31 |
| HEMA | 6 |
| Norbloc | 2 |
| CGI 1850 | 0.48 |
| TEGDMA | 1.5 |
| Blue HEMA | 0.02 |

Lenses of different powers were made. The lenses with relatively thin center thicknesses (−1.00, 90 microns and −1.75, 120 microns) displayed smooth radii, good optics and comfort. However, thicker lenses (>120 microns, −6.00 power) displayed lenses having a flattened top, with poor optics.

Examples 6-11

Photochromic Dye of Formula II (6 wt % based upon the weight of the reaction components of reactive mixture) was dissolved into reactive mixtures shown in Table 4, to form dye containing reactive mixtures of Examples 6-11. D30 was added as a diluent in the amount listed in Table 4 (based upon the amount of reaction components and diluent.

TABLE 4

| | Ex# | | | | | |
|---|---|---|---|---|---|---|
| | 6 | 7 | 8 | 9 | 10 | 11 |
| DMA | 24 | 23.89 | 23.77 | 23.77 | 23.6 | 23.45 |
| TEGDMA | 1 | 1 | 1 | 1 | 1 | 1 |
| HEMA | 9.55 | 9.55 | 9.55 | 9.55 | 9.55 | 9.55 |

TABLE 4-continued

| | Ex# | | | | | |
|---|---|---|---|---|---|---|
| | 6 | 7 | 8 | 9 | 10 | 11 |
| mPDMS | 12.5 | 12.5 | 12/5 | 12.5 | 12.5 | 12.5 |
| SiMMA | 36 | 36 | 36 | 36 | 36 | 36 |
| Norbloc | 1.7 | 1.7 | 1.7 | 1.7 | 1.7 | 1.7 |
| Irgacure 819 | 0.25 | 0.36 | 0.48 | 0.48 | 0.65 | 0.8 |
| PVP | 15 | 15 | 15 | 15 | 15 | 15 |
| % Diluent | 29 | 29 | 29 | 35 | 35 | 35 |

3 mg of the dye containing reactive mixtures were dosed into the center of Zeonor front curve lens molds. Next, 80 mg of Monomer mixture A was dosed on top of the respective dye containing reactive mixture. A polypropylene base curve was then deposited and the molds were closed. The filled molds were irradiated using Philips TL 20 W/03 T fluorescent bulbs (including UV filters within Zones 1 (A&B) and Zone 2A) above the lens molds at a constant 80° C. under the following conditions: about 7.5 minutes at about 2.2 mW/sec²(Zones 1 (A&B) and 2A)and about 7.5 minutes at 5.5 mW/sec²(Zones 2B and 3 (A&B)). All curing was done in N₂. The molds were opened and lenses were extracted into a 70:30 (wt) solution of IPA and DI H₂O at ambient temperature for at least 60 minutes. The IPA:DI water solution was exchanged twice, and soaked in IPA:DI water at ambient temperature for at least about 30 minutes for each additional exchange to remove residual diluent and monomers, placed into deionized H₂O for about 30 minutes, then equilibrated in borate buffered saline for at least about 24 hours and autoclaved at 122° C. for 30 minutes.

Formula II

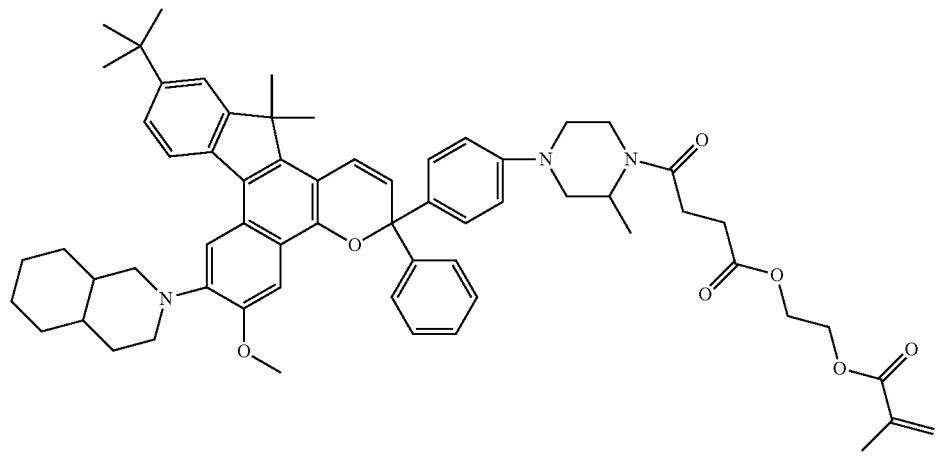

The sagittal depth at the center was measured for lenses made in each example and compared to a calculated ideal or design sagittal depth using the following procedure.

Figure 9:
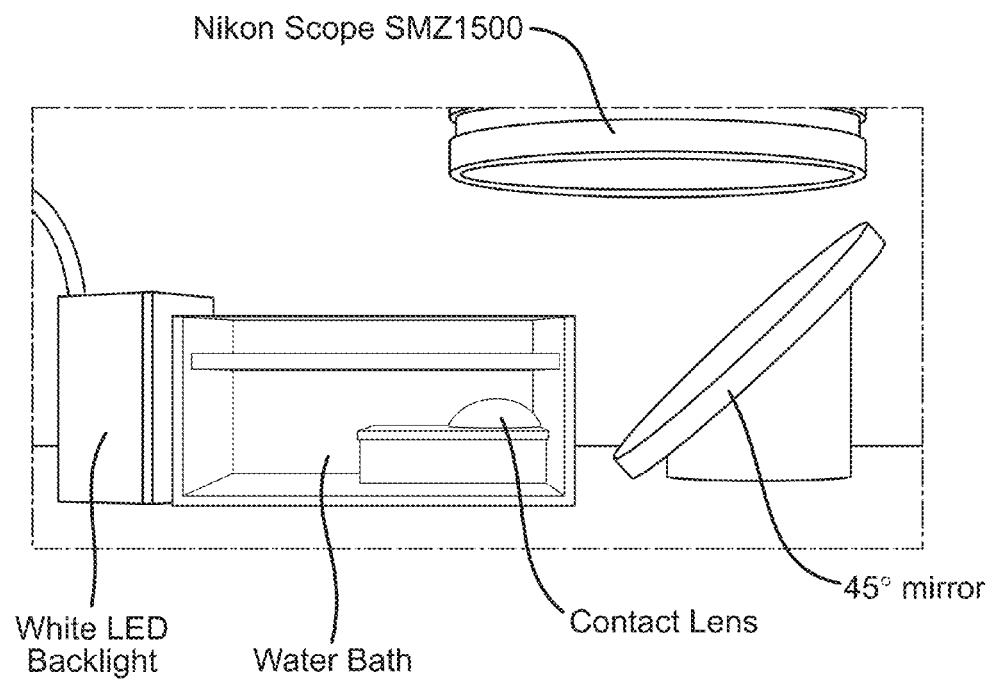
FIG. 9 is a schematic of the apparatus used to measure the deviation of sagittal depth from the design sagittal depth in the examples.

A Nikon Scope SMZ1500 with component model numbers P-BERG (eye piece), P-IBSS (beam splitter camera port), DS-Fil (camera), P-FMD (mount), 1×WD 54 (lens), and base was used. An LED Backlight was arranged adjacent to a water bath with a 45° mirror placed under a Nikon Scope 1× lens such that the light emitted from the LED Backlight illuminates through the water bath and onto the 45° mirror which reflects up into the scope. See FIG. 9.

The scope and the NIS Elements D were set to 0.75×. The contact lens was placed into the water bath with the back curve side down. The contact lens and scope were adjusted so that contact lens is in focus on the PC. The lighting was adjusted such that back and front curve surfaces are visible.

Utilizing the Radius tool in the NIS Elements D Software three points along the back curve surface were selected on each side, such that a circumscribed circle was generated showing the "ideal" curvature of the back curve of the contact lens.

Utilizing the length tool the deviation of central photochromic region was determined by measuring the distance, at contact lens center, between the actual back curve surface of the contact lens and the "ideal" curvature. Where visibility of the base curve surface in the central photochromic region was limited, a point representing the location of the back curve surface was created. A point that represents the back curve surface can be generated by measuring from the front curve surface through the contact lens for a distance equal to the center thickness of the contact lens. This set up was also used to photograph the lenses shown in FIGS. 5-8.

The deviation from the ideal is listed in Table 5, below.

TABLE 5

| Ex # | [CGI 819] | [diluent] | Ave. dev. (mm) |
|---|---|---|---|
| 6 | 0.25 | 29% | −0.109 |
| 7 | 0.36 | 29% | −0.01 |
| 8 | 0.48 | 29% | 0.057 |
| 9 | 0.48 | 36% | −0.04 |
| 10 | 0.65 | 36% | 0.0016 |
| 11 | 0.8 | 36% | −0.0038 |

Example 12 and Comparative Examples 1 and 2

Lenses were made according to Example 6, using the dye monomer mixtures listed in Table 6.

TABLE 6

| Ex # | 12 | CE1 | CE2 |
|---|---|---|---|
| DMA | 23.87 | 24 | 22.21 |
| TEGDMA | 1 | 1.25 | 1.5 |
| HEMA | 9.55 | 9.8 | 5.55 |
| mPDMS | 12.5 | 12 | 28 |
| SiMMA | 36 | 36 | 25.41 |
| Norbloc | 1.7 | 1.7 | 1.85 |
| Irgacure 819 | 0.36 | 0.23 | 0 |
| Irgacure 1850 | 0 | 0 | 0.48 |
| Blue HEMA | 0.02 | 0.02 | 0 |
| PVP | 15 | 15 | 15 |
| % Diluent | 31 | 27 | 27 |

Figure 5:
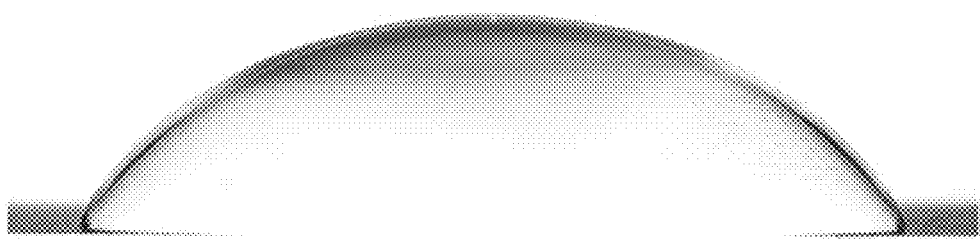
FIGS. 5-8 are photographs of the lenses of Examples 12, Comparative Examples 1 and 2 and Example 13.
Figure 6:
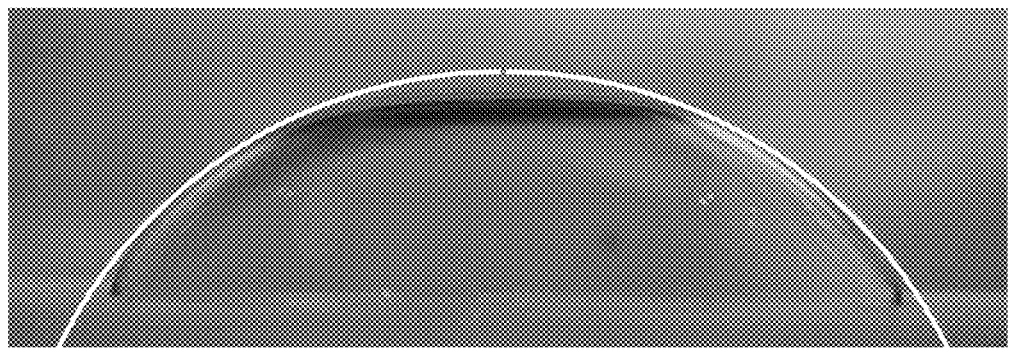
Figure 7:
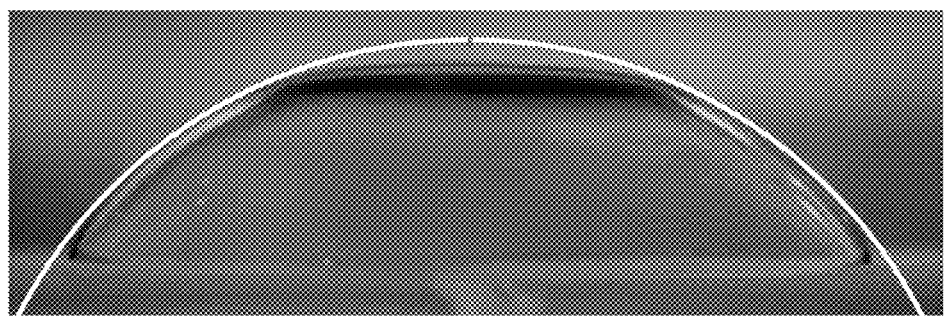

Lenses made in each of Examples 12 and Comparative Examples 1 and 2 were photographed. The images are shown at FIGS. 5-7. As can be seen from FIG. 5, the lens of Example 12 is well shaped and has a continuous curve across the entire lens surface. The average percent deviation from the base curve for five lenses is −4.5%.

The lenses of Comparative Examples 1 and 2 (FIGS. 6 and 7, respectively) show flattened tops, which deviate undesirably from the design sagittal depth. In FIG. 6, the design curve has been drawn in with a light white line, and the design sagittal height at the lens center is designated with a small white box. Comparing FIGS. 6 and 7 with FIG. 5 (Example 6) shows the substantial improvement in hydrogel lens shape which can be achieved using the present invention. The average deviation measured for Comparative Example 2 was −0.397 mm, which is more three times larger than the deviation displayed by the lenses in Example 6 (−0.109 mm).

Example 13

Lenses were made according to Example 6, but using the photochromic monomer mixture and clear monomer mixture listed in columns 2 and 3 of Table 7 below. The photochromic monomer mixture contained 6 wt % photochromic compound of Formula II and 45 wt % decanoic acid as a diluents.

TABLE 7

| Component | PMM (wt %) | CMM (wt %) |
|---|---|---|
| Blue HEMA | 0.02 | 0.02 |
| DMA | 18.9 | 18.9 |
| Norbloc | 2.2 | 2.2 |
| OH-mPDMS | 41.5 | 41.5 |
| PVP K-90 | 12 | 12 |
| TEGDMA | 3 | 3 |
| HEMA | 22.13 | 22.13 |
| CGI 819 | 0.25 | 0.25 |
| Decanoic acid (diluent) | 45 | |
| 60% t-amyl alcohol/40% decanoic acid | | 45 |

Figure 8:

FIG. 8 shows a photograph of a lens made according to Example 13. The lens is well shaped and the sagittal depth is within 100 microns of the design sagittal depth.

As stated prior, viscosity helps facilitate maintaining the photochromic within the central portion of a contact lens. However, in order to adjusts the viscosity of the inner (photochromic pupil) and outer (clear) monomers of a contact lens it is important to adjust the two monomers in such a way that the hydrated swell of the final polymer(s) do not induce stress in the transitional region that occur between the photochromic and non photochromic regions. The matching of the swell in the transitional region can be made through adjusting the levels or types of monomer components such as hydrophilic monomers including 2-hydroxyethyl methacrylate (HEMA), N,N-dimethyl acrylamide (DMA), N-vinyl pyrrolidone (NVP), N-methylacetamide, methacrylic acid, silicones, cross linker, polyvinyl pyrrolidone (PVP), polyacrylic acid (PAA), polymethylacetamide, polydimethyl acrylamide, PVA, and diluents.

The hydrogels of the present invention have water contents between about 20 and about 75% water. In yet another embodiment the hydrogel contact lenses of the present invention have a water content of at least about 25%. The lenses of the present invention may also have other desirable properties, including a tensile modulus of less than about 200 psi, in some embodiments less than about 150 psi and in other embodiments less than about 100 psi. The lenses may further have oxygen permeabilities of greater than about 50 barrers, and in some embodiments greater than about 100 barrers. It should be understood that combinations of the foregoing properties are desirable, and the above referenced ranges may be combined in any combination. In some embodiments it may be desirable to have the properties of the photochromic and non-photochromic polymers substantially matched (within about 10%).

A contact lens monomer generally includes a reactive mixture which may be polymerized via exposure to actinic radiation. Monomer A may generally include a monomer with reaction components and diluent (D30) as listed in Table 1 which can be mixed together with stirring or rolling for at least about 3 hours at about 23° C., until all components were dissolved. The reactive components are reported as weight percent of all reactive components and the diluent is weight percent of final reaction mixture. To form a lens, the reaction mixture may be placed into thermoplastic contact lens molds, and irradiated with actinic radiation such as, for example, with fluorescent bulbs at 45° C. for about 20 minutes in an $N_2$ atmosphere. The molds may be opened and lenses extracted into a 50:50 (wt) solution of IPA and $H_2O$, and soaked in IPA at ambient temperature for about 15 hours to remove residual diluent and monomers, placed into deionized H₂O for about 30 minutes, then equilibrated in borate buffered saline for at least about 24 hours and autoclaved at 122° C. for 30 minutes.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for making a photochromic, hydrogel contact lens comprising:
    dosing a first hydrogel lens composition to a front contact lens mold part; wherein the first hydrogel lens composition comprises at least one contact lens monomer and a photochromic material;
    dosing a second hydrogel lens composition to said contact lens mold part on the top of the first composition wherein the first composition has a viscosity greater than the viscosity of said second contact lens composition;
    positioning a second mold part proximate to the first mold part thereby forming a lens cavity with the first lens composition and the second composition within the lens cavity, and curing said first and second compositions to form said hydrogel contact lens having an actual sagittal depth within about 100 microns of a design sagittal depth, and wherein said first and second lens compositions, when cured, have expansion factors which are within 10% of each other.

2. The method of claim 1 wherein the said second contact lens composition is dosed as a ring around the first composition.

3. The method of claim 2 wherein the second mold part is deposited on to the front front contact lens mold part at substantially the time when the first and second lens compositions merge together.

4. The method of claim 1 wherein said first composition comprises a first contact lens monomer, a photochromic material and at least one hydrophilic polymer; and said second lens composition comprises a contact lens monomer and said at least one hydrophilic polymer, such that the inclusion of said at least one hydrophilic polymer results in substantially similar expansion factors of said first lens composition and second lens composition.

5. The method of claim 1 wherein said first composition comprises a viscosity which is at least about 1000 cp greater than the viscosity of said second lens composition.

6. The method of claim 1 wherein the said photochromic material comprises at least one polymerizable group.

7. The photochromic material of claim 6, where one of the polymerizable groups is a methacrylate group.

8. The method of claim 1 where the photochromic material is selected from the group consisting of a benzo and naphthopyran having one of the general structures selected from the group consisting of 1, 2, 3, and 4 below, and wherein $R^3$ and $R^4$ are not combined to form a spiro heterocyclic group;

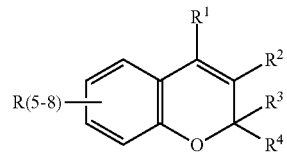

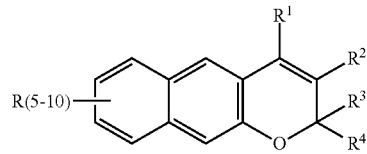

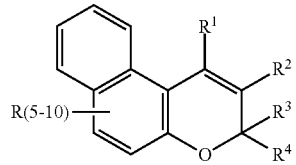

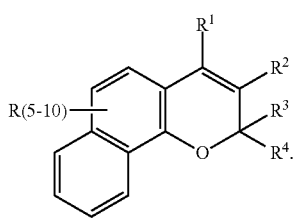

9. The method of claim 1 wherein the lens is cured by photo radiation.

10. A method for making a photochromic, hydrogel contact lens comprising:
    dosing a first hydrogel lens composition to a front contact lens mold part; wherein the first hydrogel lens composition comprises at least one contact lens monomer and a photochromic material;
    dosing a second hydrogel lens composition to said contact lens mold part on the top of the first composition wherein the first composition has a viscosity greater than the viscosity of said second contact lens composition;
    positioning a second mold part proximate to the first mold part thereby forming a lens cavity with the first lens composition and the second composition within the lens cavity, and curing said first and second compositions to form said hydrogel contact lens having a modulus of less than about 200 psi and an actual sagittal depth within about 100 microns of a design sagittal depth.

11. The method of claim 1 or 10 wherein said contact lens has a modulus of less than about 150 psi.

12. The method of claim 1 or 10 wherein said contact lens has a modulus of less than about 100 psi.

13. The method of claim 1 or 10 wherein said contact lens has an oxygen permeability of greater than about 50 barrers.

14. The method of claim 1 or 10 wherein said contact lens has an oxygen permeability of greater than about 100 barrers.

15. The method of claim 1 or 10 wherein said contact lens has a water content between about 20 and about 75%.

16. A method for making a photochromic, hydrogel contact lens comprising:
    dosing a first hydrogel lens composition to a front contact lens mold part; wherein the first hydrogel lens composition comprises at least one contact lens monomer and a photochromic material;

dosing a second hydrogel lens composition to said contact lens mold part on the top of the first composition wherein the first composition has a viscosity greater than the viscosity of said second contact lens composition;

positioning a second mold part proximate to the first mold part thereby forming a lens cavity with the first lens composition and the second composition within the lens cavity, and curing said first and second compositions to form said hydrogel contact lens having water content between about 20 and about 75% and an actual sagittal depth within about 100 microns of a design sagittal depth, wherein said first and second lens compositions, when cured, have water contents which are within 10% of each other.

* * * * *